Feb. 1, 1955  G. G. WILEY  2,700,950
MULTIPLE RANGE PRINTING APPARATUS
Filed Aug. 5, 1953
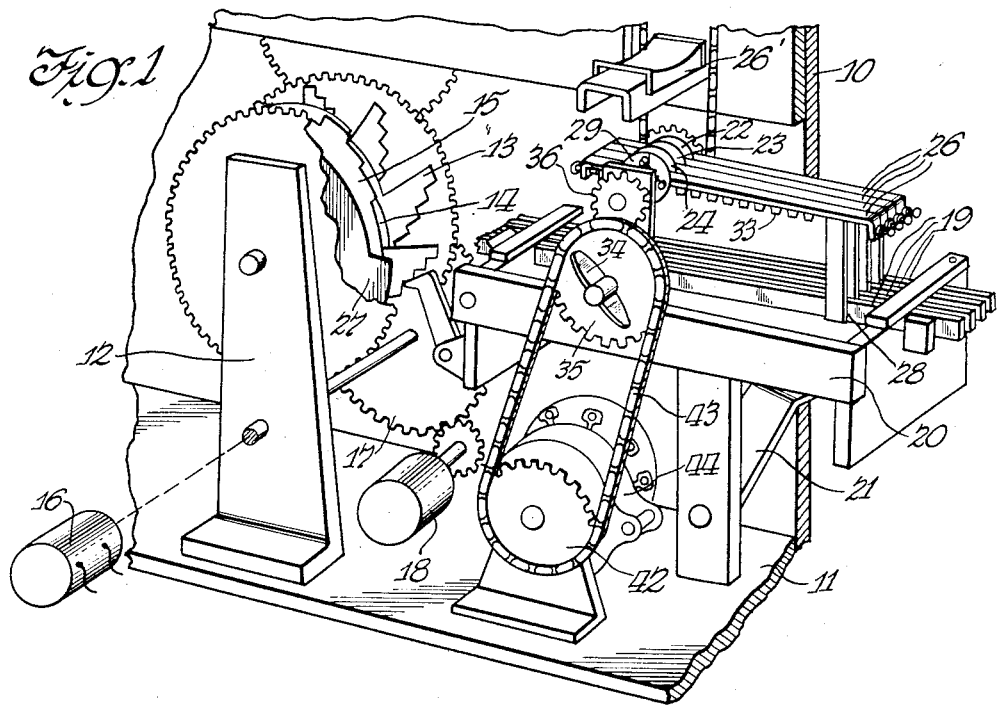
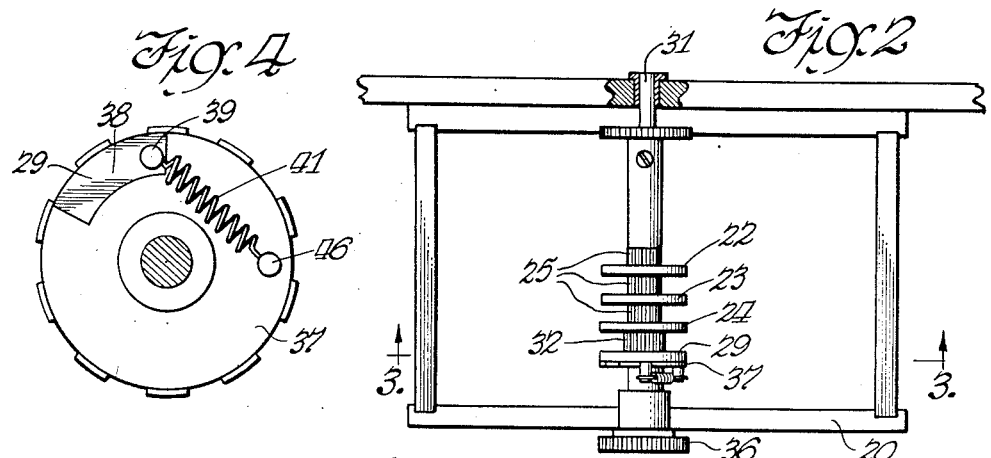
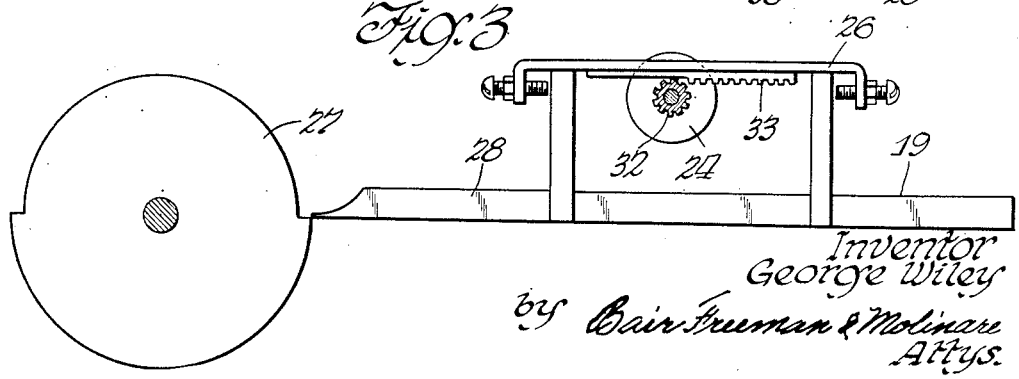
Inventor
George Wiley
by Bair Freeman & Molinare
Attys.

United States Patent Office 2,700,950
Patented Feb. 1, 1955

2,700,950

MULTIPLE RANGE PRINTING APPARATUS

George G. Wiley, Chicago, Ill., assignor to Streeter-Amet Company, Chicago, Ill., a corporation of Illinois Application August 5, 1953, Serial No. 372,465

6 Claims. (Cl. 116—114)

This invention relates to multiple range indicating mechanism and more particularly to a printing mechanism adapted to indicate values spanning a plurality of ranges in a single cycle of operation.

For many types of instruments it is desirable to indicate or print values, such, as weights, which span a plurality of ranges of adjustment of the indicating or printing elements. For example, it may be desirable to indicate or print in cycles of two thousands by twos, five thousands by fives, and the like, on an indicating or printing mechanism having only three adjustable integer elements.

Indicating or printing mechanisms of the type commonly used cannot be successfully employed for this purpose since they cannot discriminate between different ranges in a cycle. Thus, in printing two thousands by twos, the mechanisms cannot discriminate between values in the low range from 0 to 998 and in the high range between 1000 and 1998.

It is one of the objects of the present invention to provide a multiple range indicating mechanism in which an additional range indicating element is employed which is adjustable through a range cam to discriminate between different ranges in a cycle.

According to one feature of the invention, the span of values in a cycle to which the operating means will respond is adjusted by adjusting means connected to the range change element through a yielding drive so that the range change element can be adjusted to different ranges within the cycle independently of the adjusting means.

A further object is to provide an indicating mechanism in which the indicating or printing elements are adjusted by step cams whose cycle of operation spans a plurality of ranges of the indicating elements and which includes a separate range cam to adjust a range indicating element.

The above and other objects and features of the invention will be more readily apparent from the following description when read in connection with the accompanying drawings in which Figure 1 is a partial perspective view of a multiple range indicating mechanism embodying the invention;

Figure 2 is a partial plan view of the printing or indicating elements;

Figure 3 is a partial side elevation showing operation of the range change element; and Figure 4 is an enlarged end view of the range change element.

The apparatus, as shown in Figure 1, is generally similar to that more particularly disclosed and claimed in the co-pending application of Verne C. Kennedy, Jr., Serial No. 268,040, filed January 24, 1952. As shown, this mechanism comprises a frame including a vertical plate 10 supported on a base 11 and which may form a portion of a casing in which the remainder of the mechanism is enclosed. A series of step cams are supported for rotation on a horizontal axis between the plate 10 and an upright 12 supported on the base 11.

As shown, in a unit for measuring in cycles of two thousand by twos, the step cam set includes a units cam 13 which is preferably divided into ten lobes each of which has five steps thereon so that a single complete revolution of the units cam corresponds to one hundred units of twos.

The tens cam 14 is a single cam of ten steps and is secured for rotation with the units cam. A hundreds cam 15 having a number of lobes thereon corresponding to the number of ranges of the printing mechanism for a single cycle of the step cams is geared to the units and tens cams. In the embodiment illustrated, the mechanism is adapted to indicate in cycles of two thousand by units of two so that the hundreds cam will have two lobes thereon each of which is divided into ten steps.

The step cams are adapted to be set by a condition responsive mechanism such as the electrical weighing mechanism shown in the co-pending application of Verne C. Kennedy, Jr. referred to above and which includes a servo-motor 16. The servo-motor 16 is connected to the units and tens cams 13 and 14 through a gear 17 which is also geared to a balancing potentiometer 18 to rebalance the electrical weighing circuit. The units and tens cams are geared to the hundreds cam through reduction gearing, not shown, having a twenty to one ratio which will turn the hundreds cam through one step each time the tens cam turns through a complete revolution.

The step cams 13, 14 and 15 are adapted to be engaged by feeler fingers 19 which are slidably mounted on a frame 20 carried by the base 11. The feeler fingers 19 may be urged toward the step cams by individual springs, not shown, and may be moved away from the step cams by an arm 21 operated by a finger motor, as disclosed in the Kennedy application referred to above.

When the arm 21 swings to the left, as seen in Figure 1, the feeler fingers will be moved into engagement with the step cams by the springs and will be positioned to correspond to the respective units, tens and hundreds integers in the value of the condition set into the step cams by the servo-motor 16.

The feeler fingers are adapted to position indicating elements shown as printing wheels 22, 23 and 24 to print the units, tens and hundreds, respectively in the value. Each printing wheel is secured to a pinion 25 and the pinions mesh with racks 26 carried by the respective feeler fingers. In this way, the units, tens and hundreds integers in the value to be printed are properly represented on the printing wheels and may be printed on a tape or card, or the like, by a printing anvil 26', which can be moved toward the printing wheels at the desired times.

To discriminate between different ranges within a cycle of the step cams, a range cam 27 is secured to the hundreds cam to turn therewith and is divided into a number of steps corresponding to the number of ranges of the printing mechanism in a cycle. As best seen in Figure 3, for printing in cycles of two thousand by two, the range cam 27 is provided with two steps, that is, one-half of its circumference is at a less radial distance from its center than the other half of its circumference.

The range cam is adapted to be engaged by a feeler finger 28 slidably mounted on the frame 20 and urged toward the range cam by a spring, not shown. The feeler finger 28 will be retracted by the lever 21 simultaneously with the feeler fingers 19 and will be released for movement toward the range cam simultaneously with movement of the other feeler fingers.

The printing mechanism includes a range indicating element 29 which is rotatable on a central shaft 31 on which the printing wheels 22, 23 and 24 are rotatably mounted. The disc 29 is secured to a pinion 32 which is adapted to mesh with a rack 33 carried by the feeler finger 28. As shown in Figure 3, when the feeler finger is in its retracted position, the rack will be out of engagement with the pinion 32. However, when the feeler finger moves to the left toward the range cam 27, it will mesh with the pinion 32 to turn it and turn the disc 29. The range cam is so proportioned that when the feeler finger 28 registers with the high portion thereof, it will not turn the pinion 32 or disc 29, but when the feeler finger moves into the low portion of the range cam 27, it will turn the disc 29 an amount equal to one-tenth of a revolution corresponding to one step of the disc.

The disc is also adapted to be adjusted through cycle adjusting means shown as including a finger piece 34 secured to a sprocket 35 which is geared through a pinion 36 to the shaft 31. The shaft 31 is rigidly secured through a disc 37 lying adjacent to the printing wheel 29 and which is cut away through a portion of its periphery, as indicated at 38, to enable limited turning of the disc 29 relative to the disc 37. Pins 39 and 40 carried by the printing disc 29 and the disc 37, respectively, are connected by a tension spring which normally tends to hold the discs in the relative position shown in Figure 4. When the disc 29 is turned counter-clockwise by the rack 33, the pins 39 will travel through the cut out space 38 in the disc 37 thereby allowing the printing disc 39 to turn through one-tenth of a revolution without affecting the adjusting mechanism or the disc 37.

The sprocket 35 is connected to a sprocket 42 through a chain 43 and the sprocket 42 is connected to an adjusting switch 44 to change the span of a cycle. Thus, when the finger piece 34 is turned one notch to turn the disc 37 and printing disc 29 through one notch, the switch 44 will also be adjusted through one step. This switch may cooperate with the weight sensing circuit, as more particularly disclosed in Kennedy application Serial No. 268,040, to change the span of weights to which the sensing mechanism will respond.

In the specific construction shown, for example, the lowest adjustment of the sensing mechanism would respond to weights in the range from 0 to 1998 and when so adjusted, the range indicating wheel 29 would be adjusted initially to its 0 position. When the cycle adjusting means is turned through one step, it adjusts the switch 44 to condition the responsive mechanism for weights between 2000 and 3998 pounds and simultaneously adjusts the range indicating wheel 29 so that it will normally indicate two. It will be understood that any desired number of adjustments could be provided, depending upon the overall range of the entire mechanism.

In operation, assume that the cycle adjusting means is set for the cycle from 0 to 1998 and that a weight less than 1000 pounds is placed on the scale. The servomotor will then adjust the step cams to correspond to the individual integers in the value of the weight and at this time the range cam 27 will be so positioned that the feeler finger 28 will engage the outer step thereon. When the printing mechanism is energized, the feeler fingers will move into the step cams and the feeler finger 28 will engage the outer step on the range cam 27 so that its movement will be limited and the range indicating disc will not be turned. At this time, the correct value of the weight will be shown by the printing wheels 22, 23 and 24 with the range indicating disc 29 showing 0.

If the value is in excess of 1000, but less than 1998, the step cams 13, 14 and 15 will be set as before, but the range cam will be turned to a position in which its inner step registers with the feeler finger 28. Thus, when the feeler fingers move into the step cams, the feeler finger 28 will move into the inner step on the range cam so that the rack 33 will mesh with the gear 32 and will turn the range indicating disc 29 through one step so that it indicates one. Thus, when the printing is effected, the range disc 29 will properly indicate that the value is in excess of 1000.

When the cycle is adjusted through the finger piece 34, the operation will be identical except that the values will be altered in accordance with the setting. Thus, when the mechanism is set for values between 2000 and 3998 pounds, the outer step on the range cam will register with the feeler finger 28 so long as the values are less than 3000 pounds and will register with the inner step on the range cam when the values exceed 3000 pounds.

While one embodiment of the invention has been shown and described herein, it will be understood that this is illustrative only and not to be taken as a definition of the scope of the invention, reference being had for this purpose to the appended claims.

What is claimed is:

1. Multiple range indicating mechanism comprising a plurality of indicating elements, means operative through a single cycle to set said elements to values corresponding to a plurality of ranges, a range indicating element adjustable independently of the first named indicating elements, and a range cam moved by said means and having a number of steps thereon corresponding to the number of ranges through which the indicating elements are moved for each cycle of said means to set the range indicating element.

2. Multiple range indicating mechanism comprising a plurality of indicating elements, means operative through a single cycle to set said elements to values corresponding to a plurality of ranges, a range indicating element adjustable independently of the first named indicating elements, a range cam moved by said means and having a number of steps thereon corresponding to the number of ranges through which the indicating elements are moved for each cycle of said means to set the range indicating element, a cycle change device for said means, and adjusting means simultaneously to adjust the cycle change device and the range indicating element.

3. Multiple range indicating mechanism comprising a plurality of indicating elements, means operative through a single cycle to set said elements to values corresponding to a plurality of ranges, a range indicating element adjustable independently of the first named indicating elements, a cycle change device for said means, adjusting means connected to the cycle change device to set it, a yielding connection between the adjusting means and the range change element, a cam moved by the first named means and having a number of steps thereon corresponding to the number of ranges through which the indicating elements are moved for each cycle of the first named means, and means controlled by the cam to set the range change element, said yielding connection enabling setting of the range change elements by the last named means without moving the adjusting means.

4. Multiple range indicating mechanism comprising a plurality of indicating elements movable to different positions indicative of values throughout a predetermined range, a plurality of step cams, means to adjust the step cams throughout a cycle to positions corresponding to values throughout a plurality of ranges, feelers engageable with the step cams respectively and connected to the indicating elements to set them in accordance with the positions of the step cams, a range indicating element, a range cam movable with the step cam corresponding to the highest order digit in a range and having a number of steps corresponding to the number of ranges through which the step cams are adjustable in a cycle and a feeler engageable with the range cam and connected to the range indicating element to adjust it.

5. Multiple range indicating mechanism comprising a plurality of indicating elements movable to different positions indicative of values throughout a predetermined range, a plurality of step cams, means to adjust the step cams throughout a cycle to positions corresponding to values throughout a plurality of ranges, feelers engageable with the step cams respectively and connected to the indicating elements to set them in accordance with the positions of the step cams, a range indicating element, a range cam movable with the step cam corresponding to the highest order digit in a range and having a number of steps corresponding to the number of ranges through which the step cams are adjustable in a cycle, a feeler engageable with the range cam, means carried by the feeler normally out of engagement with the range indicating element but engaging the range indicating element to adjust it when the feeler moves to an inner step on the range cam, a cycle change device for the step cam adjusting means, and means simultaneously to adjust the cycle change device and the range change element.

6. Multiple range indicating mechanism comprising a plurality of indicating elements movable to different positions indicative of values throughout a predetermined range, a plurality of step cams, means to adjust the step cams throughout a cycle to positions corresponding to values throughout a plurality of ranges, feelers engageable with the step cams respectively and connected to the indicating elements to set them in accordance with the positions of the step cams, a range indicating element, a range cam movable with the step cam corresponding to the highest order digit in a range and having a number of steps corresponding to the number of ranges through which the step cams are adjustable in a cycle, a feeler engageable with the range cam, means carried by the feeler normally out of engagement with the range indicating element but engaging the range indicating element to adjust it when the feeler moves to an inner step on the range cam, a cycle change device for the step cam adjusting means, adjusting means connected to the cycle change device to adjust it, and a yielding connection between the adjusting means and the range change element whereby the range change element can be adjusted by the adjusting means or by the last named means without affecting the adjusting means.

References Cited in the file of this patent

UNITED STATES PATENTS 2,070,011    Hadley et al. _____ Feb. 9, 1937
2,623,493    Kennedy _____ Dec. 30, 1952